E. DE MOULIN.
INITIATION APPARATUS.
APPLICATION FILED FEB. 19, 1910.
1,004,857.
Patented Oct. 3, 1911.
2 SHEETS—SHEET 2.
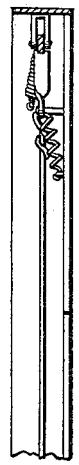
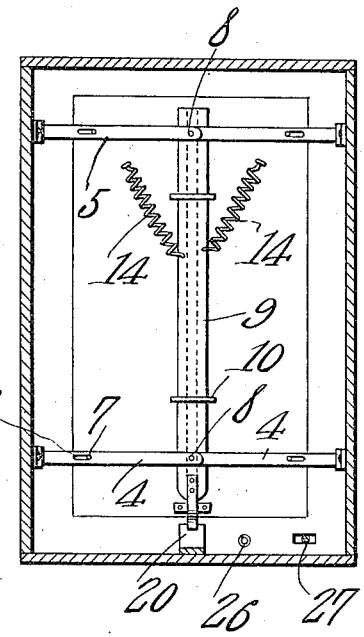
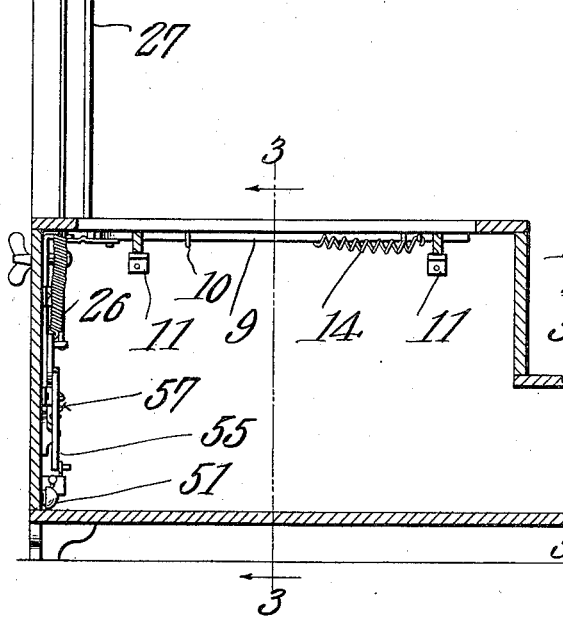
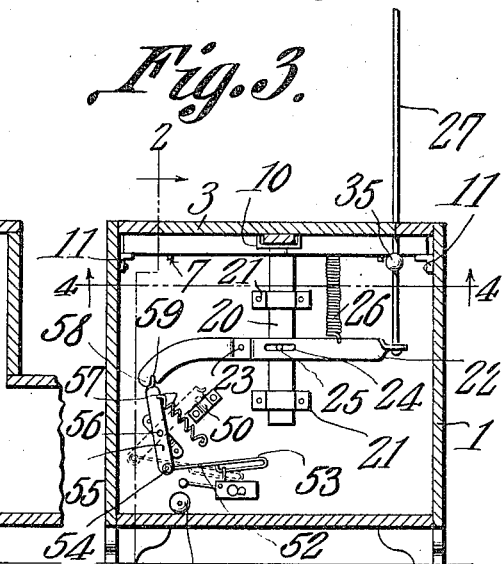

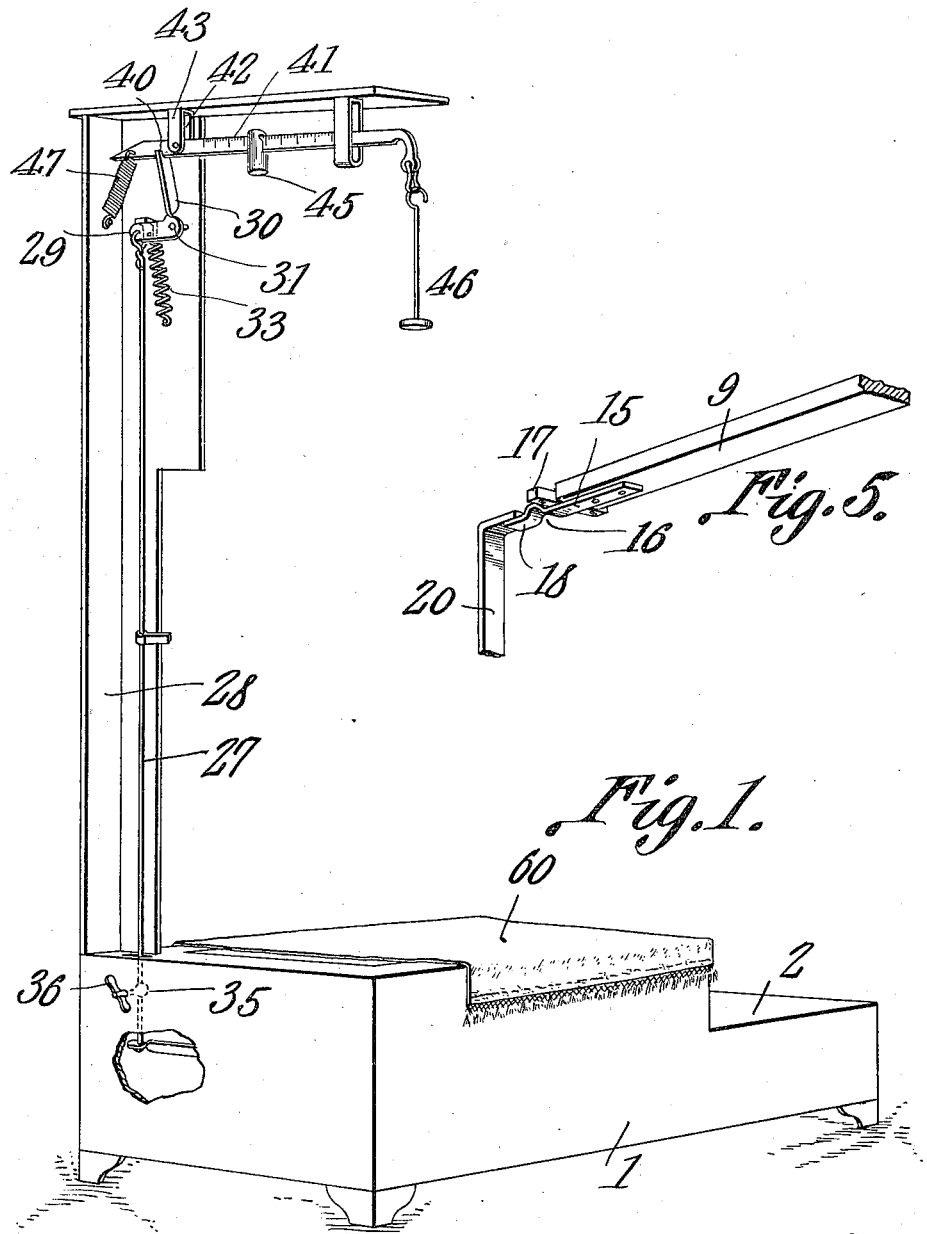

UNITED STATES PATENT OFFICE.

ERASTUS DE MOULIN, OF GREENVILLE, ILLINOIS.

INITIATION APPARATUS.

1,004,857. Specification of Letters Patent. Patented Oct. 3, 1911.

Application filed February 19, 1910. Serial No. 544,889.

*To all whom it may concern:*

Be it known that I, ERASTUS DE MOULIN, a citizen of the United States, residing at Greenville, in the county of Bond and State of Illinois, have invented a new and useful Initiation Apparatus, of which the following is a specification.

This invention relates to initiating devices such as are used particularly in the initiation exercises of secret societies.

The object of the invention is to provide a device which is adapted to deceive the candidate into the idea that he is about to weigh himself and which on the contrary will operate certain mechanism to startle and amaze the candidate.

With the foregoing and other objects in view which will appear as the description proceeds, the invention resides in the combination and arrangement of parts and in the details of construction hereinafter described and claimed, it being understood that changes in the precise embodiments of invention herein disclosed can be made within the scope of the claims without departing from the spirit of the invention.

In the accompanying drawings forming part of this specification, Figure 1 is a perspective view of an initiation device constructed in accordance with the invention. Fig. 2 is a vertical section on the line 2—2 of Fig. 3. Fig. 3 is a transverse vertical section on the line 3—3 of Fig. 2. Fig. 4 is a horizontal section on the line 4—4 of Fig. 3 looking upward toward the bottom of the platform. Fig. 5 is an enlarged detail view showing the means for releasing the platform of the scale so as to permit it to drop precipitately to the bottom of the device.

Like reference numerals indicate corresponding parts in the different figures of the drawings.

The apparatus of the present invention preferably is constructed in such manner as to resemble an ordinary scale provided with the usual scale beam. The platform of the scale is supported in a suitable box like structure and is provided with locking devices which serve normally to support the platform and which when released permit it to fall precipitately to the bottom of the device. The locking devices of the platform preferably are operated by the movement of the scale beam so that when the candidate steps upon the platform in obedience to the command to weigh himself and adjusts the weight along the scale beam in the usual manner, the downward movement of the scale beam will release the platform and cause the same to drop, the falling movement thereof being accomplished by suitable alarms, such as the explosion of a cartridge, and the sounding of a bell. Heretofore so far as I am aware, it has been customary for the candidate to mount the platform and for the platform then to be released by one of the attendants. In the present case, however, the object is to deceive the candidate into the unconscious releasing of the device.

The present invention includes a box like structure 1 which is open at its top and is provided at one end with a step or extension 2 by means of which the platform may be mounted by the candidate. Within the upper end of the box-like structure 1 is a platform 3 which is adapted normally to be locked or held in the upper end of the device and to be released by the candidate when the scale beam is operated. The locking devices for supporting the platform 3 are best shown in Fig. 4. These locking devices preferably consist of a pair of oppositely extending pivoted arms 4—4 and a similar pair of oppositely extending pivoted arms 5—5. The pivotal movement of said arms preferably is secured by forming each of the arms with a longitudinal slot 6 through which extends a pin 7 fitted into the bottom of the platform. The arms 4—4 at their inner ends preferably are mortised as shown in Fig. 3 and are pivotally connected at 8 with a slide bar 9 which is guided in its longitudinal movements by means of the loop or bracket 10 secured to the platform 3. The arms 4—4 and 5—5 normally rest upon angle irons 11 connected with the inner walls of the box 1 and thus serve to hold the platform 3 in suspended position. The means for moving the arms 4 and 5 out of engagement with the angle irons 11 preferably includes a pair of coiled springs 14 which are secured at one end to the bottom of the platform 3 and at the other end to the slide bar 9. Said slide bar 9 normally is locked against movement so as to cause the arms 4 and 5 to remain in position upon the angle irons 11, but by means of mechanism hereinafter described. When said slide bar 9 is released, the coil springs 14 draw the same longitudinally and thus cause the arms 4 and 5 to swing upon their pivot 8 and become disengaged from the angle irons 11 so as to permit the platform to drop. The means for locking the slide bar 9 against movement, are best shown in Figs. 4 and 5 of the drawing, and consist preferably of a spring catch 15 fastened to the lower surface of the slide bar 9 and having a bent portion or projection 16 adapted to fit upwardly behind a cleat 17 secured to the lower surface of the platform. The spring catch 15 is formed with an extension or tongue 18 which is adapted to be engaged by a releasing device 20. When the releasing device 20 is moved downward, the spring catch 15 becomes disengaged from the cleat 17 and permits the springs 14 to operate the slide bar 9. The releasing device 20, as shown in Fig. 3, is mounted to slide vertically in suitable guides or brackets 21, and said releasing device is operated by means of a lever 22 fulcrumed at 23 upon the end of the box 1 and having therein a slot 24 through which extends a pin 25 mounted upon the releasing device 20. The free end of the lever 22 normally is drawn upward by means of a coil spring 26. Said lever 22 is adapted to be depressed by means of a push rod 27 which, as shown in Fig. 1, extends upward within the standard of the scale, indicated by the numeral 28 and is connected at its upper end as indicated at 29 with an angle lever 30 pivoted at 31 upon the standard 28 and adapted to be drawn downward when released by means of a spring 33. The push rod 27 adjacent its lower end extends through a slide bearing 35 which is provided with a set screw 36 by means of which the push rod 27 can be locked against vertical movement whenever desired so as to prevent the operation of the device when occasion requires. The angle lever 30 by means of which the rod 27 is operated is adapted at its upper end to fit into a notch 40 formed in the scale beam 41 which is pivoted at 42 upon a bracket or hanger 43. The scale beam 41 is provided with the usual slide weight 45 and the accessories 46. The inner end of the scale beam 41 is held normally in engagement with the angle lever 30 by means such as the coil spring 47. It will be obvious that when a candidate stands upon the platform 3 and attempts to weigh himself by moving the weight 45 longitudinally along the scale beam 41, the inner end of said scale beam is raised against the action of the spring 47 so as to cause the notch 40 to become disengaged from the angle lever 30 whereupon the spring 33 draws said lever and push rod 27 downward thus operating the lever 22 and causing the releasing device 20 to slide downward and move the spring head 15 out of engagement with the cleat 17 whereby the springs 14 draw the bar 9 longitudinally and release the arms 4 and 5 so as to permit the platform to drop.

The means for firing a cartridge and for sounding an alarm bell when the platform falls will now be described with particular reference to Figs. 2 and 3.

The reference numeral 50 in Fig. 3 indicates a cartridge holder adapted to receive an ordinary blank cartridge and the numeral 51 indicates an ordinary type of spring operated bell which is adapted to be wound from time to time and is normally held in inoperative position by means of a push rod 52 having at the end thereof a loop or slot 53. This rod is engaged by a pin 54 mounted upon a trigger 55 fulcrumed at 56 and adapted when released to be operated by means of a spring 57. The trigger 55 at its upper end is twisted as indicated at 58 and is normally fitted into a notch 59 formed in the lever 22. When the lever 22 is rocked at the time the platform is released, the trigger 55 becomes disengaged therefrom, whereupon the spring 57 throws said lever into engagement with and discharges the cartridge in the cartridge holder 50 at the same time releasing the rod 52 and permitting the bell 51 to be sounded.

If desired the upper surface of the device may be concealed by means of a carpet or other covering 60 as indicated in Fig. 1, although normally the construction of the device will be such that the cover 60 can be dispensed with without arousing the suspicions of the candidate.

The device of the present invention differs from former devices of a similar character in that the platform is released by the action of the candidate instead of by one of the attendants. The surprise is then greater.

It is to be understood that the improvements of the present invention are adapted to be employed in connection with other forms of initiation apparatus than that shown in the drawings. That is to say, the releasing mechanism or weighing mechanism of the present invention may be employed in connection with other forms of initiation apparatus than a judgement stand having a collapsible platform as shown in the drawings therein.

What I claim as new is:—

1. In an apparatus of the class described, the combination of a stand in the form of an open box, a platform arranged within the stand located at and closing the top thereof and adapted when unsupported to fall precipitately to the bottom of the stand, locking devices for rigidly supporting the platform at the upper end of the stand, and an adjustable arm mounted some distance above the platform and to be operated by a person standing on the platform for releasing said locking devices.

2. A device of the character described comprising a stand, a platform located at the upper portion of the stand and adapted when released to fall to the bottom of the stand, locking devices for supporting the platform, and a scale beam adapted to be operated by the person standing on the platform for releasing said platform.

3. In an apparatus of the class described the combination of a stand in the form of an open box, a platform arranged within the stand and located at and closing the top thereof, locking devices for rigidly supporting the platform at the top of the stand, a scale beam adapted to be operated by a person standing on the platform for releasing the locking devices and alarm mechanism automatically operated upon the falling of the platform.

4. An initiation device comprising a platform, means for supporting the platform after a person steps thereon, and a scale beam adapted to be manually operated by the person while standing on the platform, for releasing the platform.

5. The combination with a collapsible platform, supporting means for the platform, and a dummy scale beam connected with the supporting means and adapted to control the same, whereby to permit the collapsing of the platform when the scale beam is operated.

6. The combination with an initiating device having a collapsible platform, of dummy weighing mechanism, supporting means for the collapsible platform, and mechanism connecting the supporting means with the dummy weighing mechanism, whereby the operation of the supporting means is controlled by the dummy weighing mechanism.

7. An initiation apparatus having a collapsible platform, devices for supporting the platform, a scale beam connected with and controlling the operation of said devices, and a weight adjustable on said scale beam.

In testimony that I claim the foregoing as my own, I have hereto affixed my signature in the presence of two witnesses.

ERASTUS DE MOULIN.

Witnesses:
H. C. DIEHL,
ERIC E. DE MOULIN.

---

Copies of this patent may be obtained for five cents each, by addressing the "Commissioner of Patents, Washington, D. C."